Patented Oct. 11, 1932

1,882,561

UNITED STATES PATENT OFFICE

JOSEF HALLER, OF WIESDORF-ON-THE-RHINE, EUGEN GLIETENBERG, OF LEVER-KUSEN-ON-THE-RHINE, AND WINFRID HENTRICH, OF WIESDORF-ON-THE-RHINE, GERMANY, ASSIGNORS TO GENERAL ANILINE WORKS, INC., OF NEW YORK, N. Y., A CORPORATION OF DELAWARE

DYEING PREPARATION

No Drawing. Application filed February 12, 1930, Serial No. 427,938, and in Germany February 25, 1929.

The present invention relates to new compositions of matter suitable for dyeing and printing processes.

In accordance with this invention a water- or alkali-soluble composition for dyeing and printing is prepared by mixing in the dry state a water-soluble diazoamino compound prepared from any diazotized aromatic amine free from sulfonic and carboxylic acid groups and a primary aromatic or secondary aromatic or aliphatic amine having at least one group inducing solubility in water, such as sulfonic or carboxylic acid group with a coupling component suitable for preparing azodyestuffs free from a sulfonic and carboxylic acid group.

The diazo amino compounds used in preparing our new compositions of matter may be represented by the general formula:

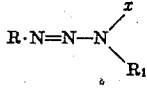

R meaning an aromatic nucleus free from a sulfonic or carboxylic acid group, $R_1$ meaning an aromatic or aliphatic hydrocarbon residue at least once substituted by a sulfonic or a carboxylic acid group and $x$ meaning hydrogen or $R_1$, are obtainable by diazotizing in the usual manner any primary aromatic amine free from a sulfonic or carboxylic acid group and adding to the diazo solution, preferably at low temperature, the equivalent quantity of a primary aromatic or secondary aromatic or aliphatic amine, being at least once substituted by a carboxylic or a sulfonic acid group. The diazo amino compounds separate or, if necessary, are salted out.

As coupling components there may be mentioned by way of example, naphthol, naphtholates, 2.3-hydroxynaphthoic acid arylides, methyl-phenyl-pyrazolones, acetoacetic acid arylides, 2-hydroxy-carbazole-o-carbonic arylides, 2.4-dihydroxy-quinolines and the like.

The relative quantities of the two components present in our new compositions of matter may be varied within the widest limits, but we prefer to mix together equivalent quantities of the diazo amino compound and of the coupling component.

Our new compositions are valuable for dyeing and printing; for the production of fast dyeings on the fiber it is only necessary to dissolve these compositions in water or in water containing alkali, in order to obtain dyestuff preparations ready for use in dyeing and printing. On acidification the diazo amino compound is split up into the two components, whereupon coupling between the diazo compound and the coupling component present occurs. A further advantage of the compositions described lies in the fact, that their solutions are very stable, some of the same considerably surpassing in this respect similar, hitherto known products. In the attached table some examples of the new compositions of this type are set forth but this table is not intended to be exhaustive:

| No. | Base | Stabilizer | Coupling component | Shade |
|---|---|---|---|---|
| 1 | 2.5-dichloro-1-amino-benzene | 4-sulfo-2-amino benzoic acid | Diacetoacetyl-o-tolidide | Yellow |
| 2 | 2.5-dichloro-1-amino-benzene | 5-sulfo-2-amino benzoic acid | 2.5-dichloro-4-nitro-1-aceto-acetylamino-benzene | Yellow |
| 3 | 4-chloro-2-amino-1-methylbenzene | 4-sulfo-2-amino benzoic acid | Diacetoacetyl-o-tolidide | Yellow |
| 4 | 4.5-dichloro-2-amino-1-methylbenzene | 4-sulfo-2-amino benzoic acid | Diacetoacetyl-o-tolidide | Yellow |
| 5 | 4-chloro-2-amino-1-methoxy benzene | Methylamino acetic acid | Diacetoacetyl-o-tolidide | Yellow |
| 6 | 2.5-dichloro-1-methyl-4-aminobenzene | 1-aminobenzene-2.5-disulfonic acid | Diacetoacetyl-o-tolidide | Yellow |
| 7 | 5-nitro-2-amino-1-methylbenzene | 1-methyl-2-ethyl-amino-benzene-4-sulfonic acid | Sodium compound of 4-nitro-2.5-dimethoxy-1-acetoacetylamino benzene | Yellow |
| 8 | 3-chloro-1-aminobenzene | 4-sulfo-2-amino benzoic acid | 2-hydroxy-naphthalene-3-carboxylic acid-o-toluidide | Orange |
| 9 | 3-chloro-1-aminobenzene | 4-amino-1-methylbenzene-2-sulfanilide | Sodium compound of 2-hydroxy-naphthalene-3-carboxylic acid-o-toluidide | Orange |
| 10 | 2.5-dichloro-1-aminobenzene | 4-sulfo-2-amino benzoic acid | 2-hydroxynaphthalene-3-carboxylic acid-o-phenetidide | Orange |
| 11 | 2.5-dichloro-1-aminobenzene | 4-sulfo-2-amino benzoic acid | Sodium compound of 2-hydroxy-naphthalene-3-carboxylic acid-o-phenetidide | Orange |
| 12 | 4-chloro-2-amino-1-methylbenzene | 4-sulfo-2-amino benzoic acid | 2-hydroxynaphthalene-3-carboxylic acid-o-phenetidide | Scarlet |

| No. | Base | Stabilizer | Coupling component | Shade |
|---|---|---|---|---|
| 13 | 2-amino-4-methoxy-5-benzoyl-amino-1-chlorobenzene | 4-sulfo-2-methylamino-benzoic acid | 2-hydroxy-naphthalene-3-carboxylic acid-o-toluidide | Violet |
| 14 | 2.5-dichloro-1-aminobenzene | 4-sulfo-2-amino-benzoic acid | 2-hydroxynaphthalene-3-carboxylic acid-o-anisidide | Scarlet |
| 15 | 2.5-dichloro-4-amino-1-methylbenzene | 5-sulfo-2-amino-benzoic acid | Sodium compound of 2-hydroxy-naphthalene-3-carboxylic acid-o-anisidide | Scarlet |
| 16 | 3-chloro-1-aminobenzene | 1-aminonaphthalene-2.4-disulfonic acid | 2-hydroxynaphthalene-3-carboxylic acid-o-anisidide | Red |
| 17 | 4.6-dichloro-2-amino-1-methylbenzene | 1-aminobenzene-2.3-dicarboxylic acid | 2-hydroxynaphthalene-3-carboxylic acid-p-anisidide | Red |
| 18 | 4.6-dichloro-2-amino-1-methylbenzene | 4-sulfo-2-amino-benzoic acid | Sodium compound of 2-hydroxynaphthalene-3-carboxylic acid-o-anisidide | Red |
| 19 | 4-chloro-2-amino-1-methylbenzene | Methylamino ethane-sulfonic acid | Sodium compound of 2-hydroxynaphthalene-3-carboxylic acid-o-anisidide | Red |
| 20 | 4-chloro-2-amino-1-methoxybenzene | Methylamino acetic acid | Sodium compound of 2-hydroxynaphthalene-3-carboxylic acid-o-anisidide | Red |
| 21 | 4-chloro-2-amino-1-methylbenzene | 4-sulfo-2-amino benzoic acid | 2-hydroxynaphthalene-3-carboxylic acid-o-toluidide | Red |
| 22 | 4-chloro-2-amino-1-methylbenzene | 5-sulfo-2-amino benzoic acid | Sodium compound of 2-hydroxynaphthalene-3-carboxylic acid anilide | Red |
| 23 | 4-nitro-2-amino-1-methoxybenzene | 1-methylaminobenzene-4-sulfonic acid | Sodium compound of 2-hydroxynaphthalene-3-carboxylic acid-m-nitranilide | Bluish-red |
| 24 | 4-amino-1.3-dimethylbenzene | 1-methyl-2-ethylamino-benzene-4-sulfonic acid | 2-hydroxynaphthalene-3-carboxylic acid-2'-methyl-4'-methoxyanilide | Turkey red |
| 25 | 4.5-dichloro-2-amino-1-methylbenzene | 4-sulfo-2-amino-benzoic acid | Sodium compound of 2-hydroxynaphthalene-3-carboxylic acid-m-nitranilide | Turkey red |
| 26 | 4.5-dichloro-2-amino-1-methylbenzene | Butylamino-acetic acid | 2-hydroxynaphthalene-3-carboxylic acid-p-anisidide | Turkey red |
| 27 | 5-nitro-2-amino-1-methylbenzene | 4-sulfo-2-amino-benzoic acid | Sodium compound of 2-hydroxynaphthalene-3-carboxylic acid-o-toluidide | Bordeaux |
| 28 | 5-nitro-2-amino-1-methylbenzene | 4-sulfo-2-amino-benzoic acid | 2-hydroxynaphthalene-3-carboxylic acid-o-toluidide | Bordeaux |
| 29 | 5-nitro-2-amino-1-methoxybenzene | Cyclohexylamino-acetic acid | Sodium compound of 2-hydroxy-naphthalene-3-carboxylic acid-α-naphthylamide | Bordeaux |
| 30 | 3-amino-4-methoxy-6-nitro-1-methylbenzene | 4-sulfo-2-amino-benzoic acid | 2-hydroxynaphthalene-3-carboxylic acid-α-naphthylamide | Bordeaux |
| 31 | 3-amino-4-methoxy-6-nitro-1-methylbenzene | 4-sulfo-2-amino benzoic acid | Sodium compound of 2-hydroxynaphthalene-3-carboxylic acid-α-naphthylamide | Bordeaux |
| 32 | 3-amino-4-methoxy-6-nitro-1-methylbenzene | Methylamino acetic acid | 2-hydroxynaphthalene-3-carboxylic acid-β-naphthylamide | Bordeaux |
| 33 | 3-amino-4-methoxy-6-nitro-1-methylbenzene | 1-methylamino-benzene-4-sulfonic acid | 2-hydroxynaphthalene-3-carboxylic acid-2',5'-dimethoxyanilide | Bordeaux |
| 34 | 5-nitro-2-amino-1-methoxybenzene | 2-ethylamino-1-methylbenzene-4-sulfonic acid | Sodium compound of 2-hydroxynaphthalene-3-carboxylic acid-α-naphthylamide | Bordeaux |
| 35 | 3-amino-4-methoxy-6-benzoylamino-1-methylbenzene | Methylamino-acetic acid | Sodium compound of 2-hydroxynaphthalene-3-carboxylic acid-anilide | Violet |
| 36 | 3-amino-4-methoxy-6-benzoylamino-1-methylbenzene | Cyclohexylamino-acetic acid | Sodium compound of 2-hydroxynaphthalene-3-carboxylic acid-o-toluidide | Violet |
| 37 | 3-amino-4-methoxy-6-benzoylamino-1-methylbenzene | 4-sulfo-2-amino-benzoic acid | 2-hydroxynaphthalene-3-carboxylic acid-o-toluidide | Violet |
| 38 | 6-amino-4-benzoylamino-1.3-dimethoxybenzene | 4-sulfo-2-amino-benzoic acid | Sodium compound of 2-hydroxynaphthalene-3-carboxylic acid-anilide | Violet |
| 39 | 6-amino-4-benzoylamino-1.3-dimethoxybenzene | Butylaminoacetic acid | 2-hydroxynaphthalene-3-carboxylic acid-o-toluidide | Violet |
| 40 | 6-amino-4-benzoylamino-1.3-dimethoxy-diphenyl | 1-aminobenzene-3.5-dicarboxylic acid | Sodium compound of 2-hydroxynaphthalene-3-carboxylic acid-5'-chloro-2'-toluidide | Violet |
| 41 | 4.4'-diamino-3.3'-dimethoxybenzene | 5-sulfo-2-amino-benzoic acid | 2-hydroxynaphthalene-3-carboxylic acid-o-toluidide | Blue |
| 42 | 6-amino-3-benzoylamino-1.4-diethoxybenzene | Methylaminoacetic acid | Sodium compound of 2-hydroxynaphthalene-3-carboxylic acid-o-toluidide | Blue |
| 43 | 6-amino-3-benzoylamino-1.4-diethoxybenzene | 4-sulfo-2-amino-benzoic acid | 2-hydroxynaphthalene-3-carboxylic acid-anilide | Blue |
| 44 | 6-amino-3-benzoylamino-4-ethoxy-1-methoxybenzene | Dibenzylamino-disulfonic acid | Sodium compound of 2-hydroxynaphthalene-3-carboxylic acid-o-toluidide | Blue |
| 45 | 6-amino-3-benzoylamino-4-ethoxy-1-methoxybenzene | 3-aminobenzene-1.2-dicarboxylic acid | Sodium compound of 2-hydroxynaphthalene-3-carboxylic acid anilide | Blue |
| 46 | 6-amino-3-benzoylamino-1.4-dimethoxybenzene | Butylaminoacetic acid | Sodium compound of 2-hydroxynaphthalene-3-carboxylic acid-o-toluidide | Blue |
| 47 | 6-amino-3-benzoylamino-1.4-dimethoxybenzene | 4-sulfo-2-aminobenzoic acid | Sodium compound of 2-hydroxynaphthalene-3-carboxylic acid-o-toluidide | Blue |
| 48 | 4-chloro-2-amino-1-methylbenzene | 4-sulfo-2-aminobenzoic acid | Sodium compound of 2-hydroxycarbazole-o-carboxylic acid-2'-toluidide | Brown |
| 49 | 4-nitro-4'-amino-2'.5'-dimethoxyazo-benzene | Methylaminoacetic acid | Sodium compound of 2-hydroxynaphthalene-3-carboxylic acid-o-toluidide | Black |
| 50 | 3-nitro-4'-amino-2'.5'-dimethoxyazo-benzene | Butylaminoacetic acid | Sodium compound of 2-hydroxynaphthalene-3-carboxylic acid-α-naphthylamide | Black |
| 51 | 4-methyl-4'-amino-2-methoxy-5-methylazobenzene | Methylaminoethanesulfonic acid | Sodium compound of 2-hydroxynaphthalene-3-carboxylic acid-o-toluidide | Black |
| 52 | 4-chloro-4'-amino-2'.5'-diethoxy-azobenzene | 2-methylamino-4-sulfobenzoic acid | Sodium compound of 2-hydroxynaphthalene-3-carboxylic acid-α-naphthylamide | Black |

We claim:

1. As a new composition of matter a mixture consisting of about equivalent quantities of a coupling component free from sulfonic or carboxylic acid groups suitable for preparing azodyestuffs and a diazo amino compound prepared from a diazotized aromatic amine of the benzene or naphthalene series free from sulfonic and carboxylic acid groups and an organic base of the group consisting of primary aromatic and secondary aliphatic and aromatic amines of the benzene or naphthalene series containing at least one sulfonic or carboxylic acid group, being suitable for dyeing and printing.

2. As a new composition of matter a mixture consisting of about equivalent quantities of a 2.3-hydroxynaphthoic acid arylide and a diazo amino compound prepared from a diazotized aromatic amine of the benzene or naphthalene series free from sulfonic and carboxylic acid groups and an organic base of the group consisting of primary aromatic and secondary aliphatic and aromatic amines of the benzene or naphthalene series containing at least one sulfonic or carboxylic acid group, being suitable for dyeing and printing.

3. As a new composition of matter a mixture consisting of about molecular proportions of a 2.3-hydroxynaphthoic acid arylide and a diazo amino compound prepared from a diazotized aminobenzene which may be substituted in the nucleus with the exception of a sulfonic or carboxylic acid group and an organic base of the group consisting of primary aromatic and secondary aliphatic and aromatic amines of the benzene or naphthalene series containing at least one sulfonic or carboxylic acid group, being suitable for dyeing and printing.

4. As a new composition of matter a mixture consisting of about molecular proportions of a 2.3-hydroxynaphthoic acid arylide and a diazo amino compound prepared from diazotized 4-chloro-2-amino-1-methylbenzene and an organic base of the group consisting of primary aromatic and secondary aliphatic and aromatic amines of the benzene or naphthalene series containing at least one sulfonic or carboxylic acid group, being suitable for dyeing and printing.

5. As a new composition of matter a mixture consisting of about molecular proportions of a coupling component free from sulfonic or carboxylic acid groups suitable for preparing azodyestuffs and a diazo amino compound prepared from a diazotized aromatic amine of the benzene or naphthalene series free from sulfonic and carboxylic acid groups and a primary aromatic amine of the benzene or naphthalene series substituted by a carboxylic and a sulfonic acid group, being suitable for dyeing and printing.

6. As a new composition of matter a mixture consisting of about equivalent proportions of a 2.3-hydroxynaphthoic acid arylide and a diazo amino compound prepared from a diazotized aromatic amine of the benzene or naphthalene series free from sulfonic and carboxylic acid groups and a primary aromatic amine of the benzene or naphthalene series being substituted by a carboxylic and a sulfonic acid group, being suitable for dyeing and printing.

7. As a new composition of matter a mixture consisting of about molecular proportions of a 2.3-hydroxynaphthoic acid arylide and a diazo amino compound prepared from a diazotized aminobenzene which may be substituted in the nucleus with the exception of a sulfonic or carboxylic acid group and a primary aromatic amine of the benzene or naphthalene series being substituted by a carboxylic and a sulfonic acid group, being suitable for dyeing and printing.

8. As a new composition of matter a mixture consisting of about molecular proportions of a 2.3-hydroxynaphthoic acid arylide and a diazo amino compound prepared from diazotized 4-chloro-2-amino-1-methylbenzene and a primary aromatic amine of the benzene or naphthalene series which is substituted by a carboxylic and a sulfonic acid group, being suitable for dyeing and printing.

9. As a new composition of matter a mixture consisting of about molecular proportions of 2.3-hydroxynaphthoic acid-o-toluidide and a diazo amino compound prepared from diazotized 4-chloro-2-amino-1-methylbenzene and 4-sulfo-2-amino-benzoic acid, being suitable for dyeing and printing.

10. As a new composition of matter a mixture consisting of about equivalent quantities of a coupling component free from sulfonic or carboxylic acid groups suitable for preparing azodyestuffs and a diazo amino compound prepared from a diazotized aromatic amine of the benzene or naphthalene series free from sulfonic and carboxylic acid groups and an organic base of the group consisting of secondary aliphatic amines containing at least one sulfonic or carboxylic acid group, being suitable for dyeing and printing.

11. As a new composition of matter a mixture consisting of about equivalent quantities of a 2.3-hydroxynaphthoic acid arylide and a diazo amino compound prepared from a diazotized aromatic amine of the benzene or naphthalene series free from sulfonic and carboxylic acid groups and an organic base of the group consisting of secondary aliphatic amines containing at least one sulfonic or carboxylic acid group, being suitable for dyeing and printing.

12. As a new composition of matter a mixture consisting of about molecular proportions of a 2.3-hydroxynaphthoic acid arylide and a diazo amino compound prepared from a diazotized aminobenzene which may be substituted in the nucleus with the exception of a sulfonic or carboxylic acid group and an organic base of the group consisting of secondary aliphatic amines containing at least one sulfonic or carboxylic acid group, being suitable for dyeing and printing.

13. As a new composition of matter a dry mixture consisting of about equivalent quantities of a coupling component free from sulfonic or carboxylic acid groups suitable for preparing azodyestuffs and a diazo amino compound prepared from a diazotized aromatic amine of the benzene or naphthalene series free from sulfonic and carboxylic acid groups and an organic base of the group consisting of primary aromatic and secondary aliphatic and aromatic amines of the benzene or naphthalene series containing at least one sulfonic or carboxylic acid group, being suitable for dyeing and printing.

14. As a new composition of matter a dry mixture consisting of about equivalent quantities of a 2.3-hydroxynaphthoic acid arylide and a diazo amino compound prepared from a diazotized aromatic amine of the benzene or naphthalene series free from sulfonic and carboxylic acid groups and an organic base of the group consisting of primary aromatic and secondary aliphatic and aromatic amines of the benzene or naphthalene series containing at least one sulfonic or carboxylic acid group, being suitable for dyeing and printing.

15. As a new composition of matter a dry mixture consisting of about molecular proportions of a 2.3-hydroxynaphthoic acid arylide and a diazo amino compound prepared from a diazotized amino-benzene which may be substituted in the nucleus with the exception of a sulfonic or carboxylic acid group and an organic base of the group consisting of primary aromatic and secondary aliphatic and aromatic amines of the benzene or naphthalene series containing at least one sulfonic or carboxylic acid group, being suitable for dyeing and printing.

16. As a new composition of matter a dry mixture consisting of about molecular proportions of a coupling component free from sulfonic or carboxylic acid groups suitable for preparing azodyestuffs and a diazo amino compound prepared from a diazotized aromatic amine of the benzene or naphthalene series free from sulfonic and carboxylic acid groups and a primary aromatic amine of the benzene or naphthalene series substituted by a carboxylic and a sulfonic acid group, being suitable for dyeing and printing.

17. As a new composition of matter a dry mixture consisting of about molecular proportions of a 2.3-hydroxynaphthoic acid arylide and a diazo amino compound prepared from diazotized 4-chloro-2-amino-1-methyl-benzene and a primary aromatic amine of the benzene or naphthalene series which is substituted by a carboxylic and a sulfonic acid group, being suitable for dyeing and printing.

18. As a new composition of matter a dry mixture consisting of about molecular proportions of 2.3-hydroxynaphthoic acid-o-toluidide and a diazo amino compound prepared from diazotized 4-chloro-2-amino-1-methylbenzene and 4-sulfo-2-amino-benzoic acid, being suitable for dyeing and printing.

In testimony whereof, we affix our signatures.

JOSEF HALLER.
EUGEN GLIETENBERG.
WINFRID HENTRICH.